US010131827B2

(12) United States Patent
Fukushima et al.

(10) Patent No.: US 10,131,827 B2
(45) Date of Patent: *Nov. 20, 2018

(54) WORKING FLUID FOR HEAT CYCLE, COMPOSITION FOR HEAT CYCLE SYSTEM, AND HEAT CYCLE SYSTEM

(71) Applicant: Asahi Glass Company, Limited, Chiyoda-ku (JP)

(72) Inventors: Masato Fukushima, Chiyoda-ku (JP); Hiroaki Mitsuoka, Chiyoda-ku (JP); Mai Tasaka, Chiyoda-ku (JP); Satoshi Kawaguchi, Chiyoda-ku (JP); Katsuya Ueno, Chiyoda-ku (JP); Toshiyuki Tanaka, Chiyoda-ku (JP); Hidekazu Okamoto, Chiyoda-ku (JP); Tetsuo Otsuka, Chiyoda-ku (JP); Yoshinobu Kadowaki, Chiyoda-ku (JP); Tatsuhiro Nogami, Chiyoda-ku (JP); Daisuke Shirakawa, Chiyoda-ku (JP); Hirokazu Takagi, Chiyoda-ku (JP); Takeaki Arai, Chiyoda-ku (JP)

(73) Assignee: AGC INC., Chiyoda-ku (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/220,549

(22) Filed: Jul. 27, 2016

(65) Prior Publication Data

US 2016/0333243 A1 Nov. 17, 2016

Related U.S. Application Data

(63) Continuation of application No. PCT/JP2015/051409, filed on Jan. 20, 2015.

(30) Foreign Application Priority Data

| | | | |
|---|---|---|---|
| Jan. 31, 2014 | (JP) | ................................ | 2014-017031 |
| Jan. 31, 2014 | (JP) | ................................ | 2014-017967 |
| Feb. 20, 2014 | (JP) | ................................ | 2014-030856 |
| Feb. 20, 2014 | (JP) | ................................ | 2014-030857 |
| Feb. 24, 2014 | (JP) | ................................ | 2014-033345 |
| Mar. 17, 2014 | (JP) | ................................ | 2014-053765 |
| Mar. 18, 2014 | (JP) | ................................ | 2014-055603 |
| Jun. 6, 2014 | (JP) | ................................ | 2014-118163 |
| Jun. 6, 2014 | (JP) | ................................ | 2014-118164 |
| Jun. 6, 2014 | (JP) | ................................ | 2014-118165 |
| Jun. 6, 2014 | (JP) | ................................ | 2014-118166 |
| Jun. 6, 2014 | (JP) | ................................ | 2014-118167 |
| Jun. 20, 2014 | (JP) | ................................ | 2014-127744 |
| Jun. 20, 2014 | (JP) | ................................ | 2014-127745 |
| Jul. 18, 2014 | (JP) | ................................ | 2014-148347 |
| Jul. 18, 2014 | (JP) | ................................ | 2014-148348 |
| Jul. 18, 2014 | (JP) | ................................ | 2014-148350 |
| Sep. 12, 2014 | (JP) | ................................ | 2014-187002 |
| Sep. 12, 2014 | (JP) | ................................ | 2014-187003 |
| Sep. 12, 2014 | (JP) | ................................ | 2014-187004 |
| Sep. 12, 2014 | (JP) | ................................ | 2014-187005 |
| Sep. 12, 2014 | (JP) | ................................ | 2014-187006 |

(51) Int. Cl.
*C09K 5/04* (2006.01)

(52) U.S. Cl.
CPC .............. *C09K 5/045* (2013.01); *C09K 5/044* (2013.01); *C09K 2205/122* (2013.01); *C09K 2205/126* (2013.01); *C09K 2205/22* (2013.01); *C09K 2205/40* (2013.01)

(58) Field of Classification Search
CPC .... C09K 5/045; C09K 5/044; C09K 2205/40; C09K 2205/126; C09K 2205/22; C09K 2205/122; F25B 1/00
USPC .......................... 252/67, 68, 69; 62/467, 468
See application file for complete search history.

(56) References Cited

U.S. PATENT DOCUMENTS

| | | | | |
|---|---|---|---|---|
| 9,828,537 | B2 * | 11/2017 | Fukushima | ............ C09K 5/045 |
| 9,969,917 | B2 * | 5/2018 | Fukushima | ............ C09K 5/045 |

(Continued)

FOREIGN PATENT DOCUMENTS

| | | |
|---|---|---|
| EP | 3 109 303 A1 | 12/2016 |
| WO | WO 2012/157764 A1 | 11/2012 |

(Continued)

OTHER PUBLICATIONS

"Overview of the High Pressure Gas Safety Act in Japan", The High Pressure Gas Safety institute of Japan, 5 pages, Mar. 18, 2018. (Year: 2018).*

(Continued)

*Primary Examiner* — Douglas J McGinty
(74) *Attorney, Agent, or Firm* — Oblon, McClelland, Maier & Neustadt, L.L.P.

(57) ABSTRACT

To provide a working fluid which has cycle performance sufficient as an alternative to R410A while the influence over global warming is sufficiently suppressed, which does not significantly increase the load to an apparatus as compared with a case where R410A is used, and which can be stably used continuously without any special measures, a composition for a heat cycle system contains the working fluid, and a heat cycle system employs the composition. A working fluid for heat cycle, wherein the global warming potential is less than 300; the product of the relative coefficient of performance and the relative refrigerating capacity is at least 0.820 relative to R410A in a standard refrigerating cycle under conditions of an evaporation temperature of 0° C., a condensing temperature of 40° C., a supercoiling degree of 5° C. and a degree of superheat of 5° C.; the relative compressor discharge gas pressure is at most 1.100; the lower limit of the combustion range by method A in High Pressure Gas Safety Act is at least 5 vol %; and the pressure will not exceed 2.00 MPaG in a combustion test by method A in High Pressure Gas Safety act under 0.98 MPaG at 250° C.

10 Claims, 1 Drawing Sheet

(56) References Cited

U.S. PATENT DOCUMENTS

| | | | |
|---|---|---|---|
| 2010/0090156 A1 | 4/2010 | Nappa et al. | |
| 2011/0252801 A1* | 10/2011 | Minor | C09K 3/30 60/645 |
| 2011/0253927 A1* | 10/2011 | Minor | C08J 9/146 252/68 |
| 2014/0070132 A1 | 3/2014 | Fukushima | |
| 2014/0077123 A1 | 3/2014 | Fukushima | |
| 2016/0333245 A1* | 11/2016 | Fujii | C09K 5/045 |
| 2016/0340565 A1* | 11/2016 | Tasaka | C09K 5/045 |
| 2016/0347979 A1* | 12/2016 | Okamoto | C09K 5/045 |
| 2016/0347980 A1* | 12/2016 | Okamoto | C09K 5/045 |
| 2016/0347981 A1* | 12/2016 | Fukushima | C09K 5/045 |
| 2016/0347982 A1* | 12/2016 | Fukushima | C09K 5/045 |
| 2016/0355716 A1* | 12/2016 | Fukushima | C09K 5/045 |
| 2016/0369145 A1* | 12/2016 | Fukushima | C09K 5/045 |
| 2017/0029911 A1* | 2/2017 | Dan | C21D 8/00 |
| 2017/0058171 A1* | 3/2017 | Fukushima | C09K 5/045 |
| 2017/0058173 A1* | 3/2017 | Fukushima | C09K 5/045 |
| 2017/0081575 A1* | 3/2017 | Kuroki | F25B 45/00 |

FOREIGN PATENT DOCUMENTS

| | | |
|---|---|---|
| WO | WO 2012/157765 A1 | 11/2012 |
| WO | WO 2015/005290 A1 | 1/2015 |

OTHER PUBLICATIONS

International Search Report dated Apr. 28, 2015 in PCT/JP2015/051409, filed on Jan. 20, 2015.

High Pressure Gas Safety Association. "Report on flammability test method investigation—Year of 2014, Ministry of Economy, Trade and Industry, High Pressure Gas Safety Measures (Review on preparation and operation of High Pressure Gas Safety Technical Standards), Regulations related to general high pressure gas safety". Mar. 2015. (w/ partial English translation).

* cited by examiner

WORKING FLUID FOR HEAT CYCLE, COMPOSITION FOR HEAT CYCLE SYSTEM, AND HEAT CYCLE SYSTEM

TECHNICAL FIELD

The present invention relates to a working fluid for heat cycle, a composition for a heat cycle system comprising the working fluid, and a heat cycle system employing the composition.

BACKGROUND ART

In this specification, abbreviated names of halogenated hydrocarbon compounds are described in brackets after the compound names, and in this specification, the abbreviated names are employed instead of the compound names as the case requires.

Heretofore, as a working fluid for a heat cycle system such as a refrigerant for a refrigerator, a refrigerant for an air-conditioning apparatus, a working fluid for power generation system (such as exhaust heat recovery power generation), a working fluid for a latent heat transport apparatus (such as a heat pipe) or a secondary cooling fluid, a chlorofluorocarbon (CFC) such as chlorotrifluoromethane or dichlorodifluoromethane or a hydrochlorofluorocarbon (HCFC) such as chlorodifluoromethane has been used. However, influences of CFCs and HCFCs over the ozone layer in the stratosphere have been pointed out, and their use is regulated at present.

Under the above conditions, as a working fluid for a heat cycle system, a hydrofluorocarbon (HFC) which has less influence over the ozone layer, such as difluoromethane (HFC-32), tetrafluoroethane or pentafluoroethane (HFC-125) has been used, instead of CFCs and HCFCs. For example, R410A (a pseudoazeotropic mixture refrigerant of HFC-32 and HFC-125 in a mass ratio of 1:1) is a refrigerant which has been widely used. However, it is pointed out that HFCs may cause global warming.

R410A has been widely used for a common air-conditioning apparatus such as a so-called package air-conditioner or room air-conditioner, due to its high refrigerating capacity. However, it has a global warming potential (GWP) of so high as 2,088, and accordingly development of a working fluid with low GWP has been desired. Further, development of a working fluid has been desired on the condition that R410A is simply replaced and existing apparatus will be used as they are.

In recent years, a hydrofluoroolefin (HFO) i.e. a HFC having a carbon-carbon double bond is expected, which is a working fluid having less influence over the ozone layer and having less influence over global warming, since the carbon-carbon double bond is likely to be decomposed by OH radicals in the air. In this specification, a saturated HFC will be referred to as a HFC and distinguished from a HFO unless otherwise specified. Further, a HFC may be referred to as a saturated hydrofluorocarbon in some cases.

As a working fluid employing a HFO, for example, Patent Document 1 discloses a technique relating to a working fluid using 1,1,2-trifluoroethylene (HFO-1123) which has the above properties and with which excellent cycle performance will be obtained. Patent Document 1 also discloses an attempt to obtain a working fluid comprising HFO-1123 and various HFCs or HFOs in combination for the purpose of increasing the flame retardancy, cycle performance, etc. of the working fluid. Further, similarly, Patent Document 2 discloses a technique relating to a working fluid comprising 1,2-difluoroethylene (HFO-1132).

However, Patent documents 1 and 2 failed to disclose or suggest to combine HFO-1123 or HFO-1132 with a HFC or another HFO to obtain a working fluid, with a view to obtaining a working fluid which is practically useful as an alternative to R410A comprehensively considering such requirements that the cycle performance such as the capacity and the efficiency equal to or higher than that of R410A will be obtained, the load to the apparatus such as the temperature or the pressure at the time of operation will not increase, and the working fluid can be stably used continuously without any special measures.

PRIOR ART DOCUMENTS

Patent Documents

Patent Document 1: WO2012/157764
Patent Document 2: WO2012/157765

DISCLOSURE OF INVENTION

Technical Problem

It is an object of the present invention to provide a working fluid used for a heat cycle system, which has cycle performance sufficient as an alternative to R410A while the influence over global warming is sufficiently suppressed, which does not significantly increase the load to the apparatus as compared with a case where R410A is used, and which can be stably used continuously without any special measures, a composition for a heat cycle system comprising the working fluid, and a heat cycle system employing the composition.

Solution to Problem

The present invention provides a working fluid for heat cycle, a composition for a heat cycle system and a heat cycle system of the following [1] to [10].

[1] A working fluid for heat cycle having the following properties (A-1) to (E-1):

(A-1) the global warming potential (100 years) in Intergovernmental Panel on Climate Change (IPCC), Fourth assessment report, is less than 300;

(B-1) the product of the relative refrigerating capacity ($RQ_{R410A}$) calculated in accordance with the following formula (X) and the relative coefficient of performance ($RCOP_{R410A}$) calculated in accordance with the following formula (Y) is at least 0.820:

$$\text{Relative refrigerating capacity } (RQ_{R410A}) = \frac{\text{Refrigerating capacity of sample } (Q_{sample})}{\text{Refrigerating capacity of } R410A \ (Q_{R410A})} \quad (X)$$

$$\text{Relative performance of coefficient } (RCOP_{R410A}) = \frac{\text{Coefficient of performance of sample } (COP_{sample})}{\text{Coefficient of performance of } R410A \ (COP_{R410A})} \quad (Y)$$

wherein R410A is a mixture of difluoromethane and pentafluoroethane in a mass ratio of 1:1, and the sample is a working fluid to be subjected to relative evaluation; the refrigerating capacity of each of the sample and R410A is an output (kW) when a standard refrigerating cycle is operated under the following temperature conditions (T) using each of the sample and R410A; and the coefficient of performance of each of the sample and R410A is a value obtained by dividing the above output (kW) by the power consumption (kW) required for the above operation using each of the sample and R410A;

[Temperature Conditions (T)] the evaporation temperature is 0° C. (in the case of a non-azeotropic mixture, the average temperature of the evaporation initiation temperature and the evaporation completion temperature), the condensing temperature is 40° C. (in the case of a non-azeotropic mixture, the average temperature of the condensation initiation temperature and the condensation completion temperature), the supercooling degree (SC) is 5° C., and the degree of superheat (SH) is 5° C.;

(C-1) the relative pressure ($RDP_{R410A}$) calculated in accordance with the following formula (Z) is at most 1.100:

$$\text{Relative pressure} \atop (RDP_{R410A}) = \frac{\text{Compressor discharge gas pressure of sample } (DP_{sample})}{\text{Compressor discharge gas pressure of } R410A \ (DP_{R410A})} \quad (Z)$$

wherein R410A is a mixture of difluoromethane and pentafluoroethane in a mass ratio of 1:1, and the sample is a working fluid to be subjected to relative evaluation; the compressor discharge gas pressure of each of the sample and R410A is a compressor discharge gas pressure when a standard refrigerating cycle is operated under the above temperature conditions (T) using each of the sample and R410A;

(D-1): the lower limit of the combustion range measured in accordance with method A in High Pressure Gas Safety Act is at least 5 vol %; and (E-1) in a combustion test under conditions of 0.98 MPaG and 250° C. in equipment in accordance with method A for measurement of the combustion range in High Pressure Gas Safety Act, the pressure will not exceed 2.00 MPaG.

[2] The working fluid according to [1], wherein the global warming potential is at most 250.

[3] The working fluid according to [1], wherein the global warming potential is at most 200.

[4] The working fluid according to any one of [1] to [3], wherein the product of the relative coefficient of performance ($RCOP_{R410A}$) and the relative refrigerating capacity ($RQ_{R410A}$) is at least 0.900.

[5] The working fluid according to [4], wherein the product of the relative coefficient of performance ($RCOP_{R410A}$) and the relative refrigerating capacity ($RQ_{R410A}$) is at least 0.950.

[6] The working fluid according to any one of [1] to [5], wherein the relative pressure ($RDP_{R410A}$) is at most 1.000.

[7] The working fluid according to any one of [1] to [6], which has no combustion range.

[8] A composition for a heat cycle system, which comprises the working fluid for heat cycle as defined in any one of [1] to [7] and a refrigerant oil.

[9] A heat cycle system, which employs the composition for a heat cycle system as defined in [8].

[10] The heat cycle system according to [9], which is a refrigerating apparatus, an air-conditioning apparatus, a power generation system, a heat transport apparatus or a secondary cooling machine.

Advantageous Effects of Invention

According to the present invention, it is possible to provide a working fluid to be used for a heat cycle system, which has cycle performance sufficient as an alternative to R410A while the influence over global warming is sufficiently suppressed, which does not significantly increase the load to the apparatus as compared with a case where R410A is used, and which can be stably used continuously without any special measures, and a composition for a heat cycle system comprising it.

The heat cycle system of the present invention is a heat cycle system which employs a composition for a heat cycle system which can replace R410A without any special measures to the apparatus and which has less influence over global warming potential.

DESCRIPTION OF EMBODIMENTS

Figure 1:
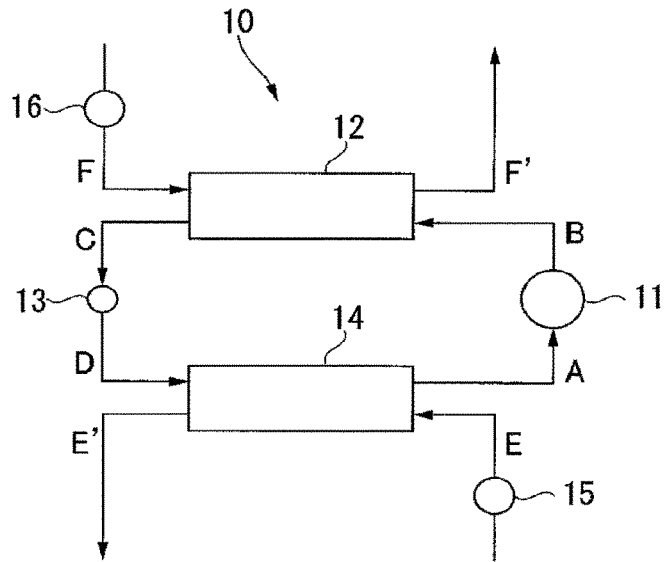
FIG. 1 is a schematic construction view illustrating an example of a standard refrigerating cycle system to evaluate the heat cycle system of the present invention.

Now, the present invention will be described in detail.

[Working Fluid]

The working fluid for heat cycle of the present invention (hereinafter sometimes referred to simply a "working fluid") has the following properties (A-1) to (E-1).

(A-1) The global warming potential (100 years) in Intergovernmental Panel on Climate Change (IPCC), Fourth assessment report, is less than 300. In the following description, the global warming potential will sometimes be referred to as "GWP".

(B-1) The product of the relative refrigerating capacity ($RQ_{R410A}$) calculated in accordance with the above formula (X) and the relative coefficient of performance ($RCOP_{R410A}$) calculated in accordance with the above formula (Y) is at least 0.820. In the following description, the above product will sometimes be referred to as "relative cycle performance (relative to R410A)" or simply as "relative cycle performance".

(C-1) The relative pressure ($RDP_{R410A}$) calculated in accordance with the above formula (Z) is at most 1.100.

(D-1) The lower limit of the combustion range measured in accordance with method A in High Pressure Gas Safety Act is at least 5 vol %. Hereafter the lower limit of the combustion range will sometimes be referred to as "combustion lower limit".

(E-1) In a combustion test under conditions of 0.98 MPaG and 250° C. in equipment in accordance with method A for measurement of the combustion range in High Pressure Gas Safety Act, the pressure will not exceed 2.00 MPaG. "G" following the pressure unit MPa represents the gauge pressure. Hereinafter a property such that the pressure in the combustion test exceeds 2.00 MPaG will be referred to as "self-decomposition property".

In the present invention, as described above, physical properties of (A) GWP, (B) relative cycle performance (relative to R410A), (C) relative pressure ($RDP_{R410A}$), (D) combustion lower limit and (E) self-decomposition property are employed as indices, and with respect to (A) to (E), the following conditions (A-1) to (E-1) are required to be satisfied as essential conditions for the working fluid. Now, (A) to (E) will be described.

(A) GWP

GWP is an index to the influence of the working fluid over global warming. In this specification, GWP of a mixture is represented by a weighted average by the composition mass. GWP of R410A to be replaced by the working fluid according to an embodiment of the present invention is 2088, and the influence of R410A over global environment is significant. On the other hand, GWP of the working fluid according to an embodiment of the present invention is less than 300 as defined by (A-1).

The working fluid according to an embodiment of the present invention is a working fluid which has very low GWP and has little influence over global warming as described above, while having substantially the same cycle performance as the cycle performance of R410A as described hereinafter. GWP of the working fluid according to an embodiment is preferably at most 250, more preferably at most 200, particularly preferably at most 150.

(B) Relative Cycle Performance (Relative to R410A)

The relative cycle performance (relative to R410A) is an index to the cycle performance of the working fluid in terms of relative comparison with the cycle performance of R410A to be replaced. The relative cycle performance (relative to R410A) is specifically represented by the product of the relative refrigerating capacity ($RQ_{R410A}$) and the relative coefficient of performance ($RCOP_{R410A}$) as described hereinafter. By employing the product of the relative refrigerating capacity ($RQ_{R410A}$) and the relative coefficient of performance ($RCOP_{R410A}$) as an index, the capacity and the efficiency of the working fluid can be evaluated in a balanced manner by one index.

The working fluid according to an embodiment of the present invention has a relative cycle performance (relative to R410A) of at least 0.820 as defined by (B-1). A working fluid which satisfies both the conditions (A-1) and (B-1), can be a working fluid which has cycle performance substantially equal to or higher than R410A and which has remarkably reduced influence over global warming. The relative cycle performance (relative to R410A) of the working fluid according to an embodiment is preferably at least 0.900, more preferably at least 0.950, particularly preferably at least 1.000.

The upper limit of the relative cycle performance (relative to R410A) of the working fluid according to an embodiment is not particularly limited.

Here, the cycle performance is performance required when the working fluid is applied to heat cycle, and is evaluated by the coefficient of performance and the capacity. In a case where the heat cycle system is a refrigerating cycle system, the capacity is refrigerating capacity. The refrigerating capacity (hereinafter sometimes referred to as "Q" in this specification) is an output in the refrigerating cycle system. The coefficient of performance (hereinafter sometimes referred to as "COP" in this specification) is a value obtained by dividing the output (kW) by the power (kW) consumed to obtain the output (kW) and corresponds to the energy consumption efficiency. A higher output will be obtained with a low input when the coefficient of performance is higher.

In the present invention, to employ the relative cycle performance (relative to R410A) as the index, a standard refrigerating cycle under the following temperature conditions (T) is employed. The relative refrigerating capacity of the working fluid relative to R410A under the conditions is the relative refrigerating capacity ($RQ_{R410A}$) obtained in accordance with the following formula (X). Likewise, the relative coefficient of performance of the working fluid relative to R410A is the relative coefficient of performance ($RCOP_{R410A}$) obtained in accordance with the following formula (Y). In the following formulae (X) and (Y), the sample represents the working fluid to be subjected to relative evaluation.

[Temperature Conditions (T)]

Evaporation temperature: 0° C. (in the case of a non-azeotropic mixture, the average temperature of the evaporation initiation temperature and the evaporation completion temperature)

Condensing temperature: 40° C. (in the case of a non-azeotropic mixture, the average temperature of the condensation initiation temperature and the condensation completion temperature)

Supercooling degree (SC): 5° C.

Degree of superheat (SH): 5° C.

$$\text{Relative refrigerating capacity } (RQ_{R410A}) = \frac{\text{Refrigerating capacity of sample } (Q_{sample})}{\text{Refrigerating capacity of } R410A \ (Q_{R410A})} \quad (X)$$

$$\text{Relative performance of coefficient } (RCOP_{R410A}) = \frac{\text{Coefficient of performance of sample } (COP_{sample})}{\text{Coefficient of performance of } R410A \ (COP_{R410A})} \quad (Y)$$

The standard refrigerating cycle system employed for the above evaluation may, for example, a refrigerating cycle system of which the schematic construction view is shown in FIG. 1. Now, the method for obtaining the refrigerating capacity and the coefficient of performance of a predetermined working fluid employing the refrigerating cycle system shown in FIG. 1 will be described.

A refrigerating cycle system 10 shown in FIG. 1 is a system generally comprising a compressor 11 to compress a working fluid vapor A to form a high temperature/high pressure working fluid vapor B, a condenser 12 to cool and liquefy the working fluid vapor B discharged from the compressor 11 to form a low temperature/high pressure working fluid C, an expansion valve 13 to let the working fluid C discharged from the condenser 12 expand to form a low temperature/low pressure working fluid D, an evaporator 14 to heat the working fluid D discharged from the expansion valve 13 to form a high temperature/low pressure working fluid vapor A, a pump 15 to supply a load fluid E to the evaporator 14, and a pump 16 to supply a fluid F to the condenser 12.

In the refrigerating cycle system 10, a cycle of the following (i) to (iv) is repeated.

(i) A working fluid vapor A discharged from an evaporator 14 is compressed by a compressor 11 to form a high temperature/high pressure working fluid vapor B (hereinafter referred to as "AB process").

(ii) The working fluid vapor B discharged from the compressor 11 is cooled and liquefied by a fluid F in a condenser 12 to form a low temperature/high pressure working fluid C. At that time, the fluid F is heated to form a fluid F', which is discharged from the condenser 12 (hereinafter referred to as "BC process").

(iii) The working fluid C discharged from the condenser 12 is expanded in an expansion valve 13 to form a low temperature/low pressure working fluid D (hereinafter referred to as "CD process").

(iv) The working fluid D discharged from the expansion valve 13 is heated by a load fluid E in the evaporator 14 to form a high temperature/low pressure working fluid vapor A. At that time, the load fluid E is cooled and becomes a load fluid E', which is discharged from the evaporator 14 (hereinafter referred to as "DA process").

The refrigerating cycle system 10 is a cycle system comprising an adiabatic isoentropic change, an isenthalpic change and an isobaric change. The state change of the working fluid, as represented on a pressure-enthalpy chart (curve) as shown in FIG. 2, may be represented as a trapezoid having points A, B, C and D as vertexes.

Figure 2:
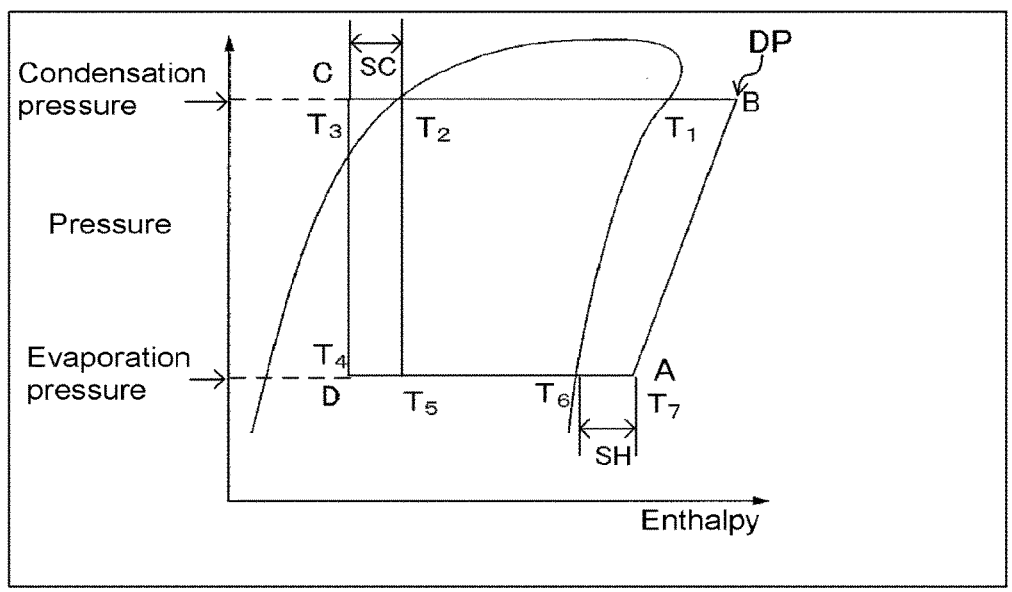
FIG. 2 is a cycle diagram illustrating the state change of the working fluid in a refrigerating cycle system in FIG. 1 on a pressure-enthalpy chart.

The AB process is a process wherein adiabatic compression is carried out by the compressor 11 to change the high temperature/low pressure working fluid vapor A to a high temperature/high pressure working fluid vapor B, and is represented by the line AB in FIG. 2. As described hereinafter, the working fluid vapor A is introduced to the compressor 11 in a superheated state, and the obtainable working fluid vapor B is also a superheated vapor. The compressor discharge gas pressure (discharge pressure) employed to calculate (C) the relative pressure ($RDP_{R410A}$) as described hereinafter is the pressure (DP) in the state B in FIG. 2 and is the maximum pressure in the refrigerating cycle. The temperature in the state B in FIG. 2 is the compressor discharge gas temperature (discharge temperature) and is the maximum temperature in the refrigerating cycle.

The BC process is a process wherein isobaric cooling is carried out in the condenser 12 to change the high temperature/high pressure working fluid vapor B to a low temperature/high pressure working fluid C and is represented by the BC line in FIG. 2. The pressure in this process is the condensation pressure. Of the two intersection points of the pressure enthalpy chart and the BC line, the intersection point $T_1$ on the high enthalpy side is the condensing temperature, and the intersection point $T_2$ on the low enthalpy side is the condensation boiling point temperature.

The CD process is a process wherein isenthalpic expansion is carried out by the expansion valve 13 to change the low temperature/high pressure working fluid C to a low temperature/low pressure working fluid D and is presented by the CD line in FIG. 2. $T_2$-$T_3$ corresponds to the supercooling degree (SC) of the working fluid in the cycle of (i) to (iv), where $T_3$ is the temperature of the low temperature/high pressure working fluid C.

The DA process is a process wherein isobaric heating is carried out in the evaporator 14 to have the low temperature/low pressure working fluid D returned to a high temperature/low pressure working fluid vapor A, and is represented by the DA line in FIG. 2. The pressure in this process is the evaporation pressure. Of the two intersection points of the pressure enthalpy chart and the DA line, the intersection point $T_6$ on the high enthalpy side is the evaporation temperature. $T_7$-$T_6$ corresponds to the degree of superheat (SH) of the working fluid in the cycle of (i) to (iv), where $T_7$ is the temperature of the working fluid vapor A. $T_4$ indicates the temperature of the working fluid D.

Q and COP of the working fluid are obtained respectively in accordance with the following formulae (11) and (12) from enthalpies $h_A$, $h_B$, $h_C$ and $h_D$ in the respective states A (after evaporation, high temperature and low pressure), B (after compression, high temperature and high pressure), C (after condensation, low temperature and high pressure) and D (after expansion, low temperature and low pressure) of the working fluid.

It is assumed that there is no loss in the equipment efficiency and no pressure loss in the pipelines and heat exchangers.

The thermodynamic properties required for calculation of the cycle performance of the working fluid are calculated based on the generalized equation of state (Soave-Redlich-Kwong equation) based on the law of corresponding state and various thermodynamic equations. If a characteristic value is not available, it is calculated employing an estimation technique based on a group contribution method.

$$Q = h_A - h_D \quad (11)$$

$$COP = Q/\text{compression work} = (h_A - h_D)/(h_B - h_A) \quad (12)$$

Q represented by the above ($h_A$-$h_D$) corresponds to the output (kW) of the refrigerating cycle, and the compression work represented by ($h_B$-$h_A$), for example, an electric energy required to operate a compressor, corresponds to the power (kW) consumed. Further, Q means a capacity to freeze a load fluid, and a higher Q means that more works can be done in the same system. In other words, it means that with a working fluid having a higher Q, the desired performance can be obtained with a smaller amount, whereby the heat cycle system can be downsized.

Further, the relative refrigerating capacity ($RQ_{R410A}$) and the relative coefficient of performance ($RCOP_{R410A}$) of the working fluid according to an embodiment satisfy the above condition (B-1) and in addition, the relative refrigerating capacity ($RQ_{R410A}$) is preferably at least 0.820, and the relative coefficient of performance ($RCOP_{R410A}$) is preferably at least 0.960. More preferably, the relative refrigerating capacity ($RQ_{R410A}$) is at least 0.950, and the relative coefficient of performance ($RCOP_{R410A}$) is at least 0.980.

(C) Relative pressure ($RDP_{R410A}$)

The relative pressure ($RDP_{R410A}$) is an index to the load of the working fluid to an apparatus represented by relative comparison with the load of R410A to be replaced to an apparatus. The relative pressure ($RDP_{R410A}$) is represented by the ratio of the compressor discharge gas pressure ($DP_{sample}$) when the standard refrigerating cycle under the above temperature conditions (T) is operated by using the working fluid (sample) to the compressor discharge gas pressure ($DP_{R410A}$) when the cycle is operated by using R410A, as shown in the following formula (Z).

$$\text{Relative pressure } (RDP_{R410A}) = \frac{\text{Compressor discharge gas pressure of sample } (DP_{sample})}{\text{Compressor discharge gas pressure of R410A } (DP_{R410A})} \quad (Z)$$

As described above, the compressor discharge gas pressure means the maximum pressure in the standard refrigerating cycle under the above temperature conditions, and from the value, it is possible to estimate the pressure load to an apparatus when a heat cycle system such as a refrigerating apparatus or an air-conditioning apparatus is practically operated using the working fluid.

The working fluid according to an embodiment of the present invention has a relative pressure ($RDP_{R410A}$) of at most 1.100 as shown by (C-1). When the relative pressure ($RDP_{R410A}$) of the working fluid according to an embodiment is at most 1.100, the pressure load to an apparatus will hardly increase when a heat cycle system is operated using such a working fluid by using a predetermined apparatus under predetermined conditions, as compared with a case where the heat cycle system is operated using R410A by using the same apparatus under the same conditions. That is, when the condition (C-1) is satisfied, the working fluid according to an embodiment can be basically used for an apparatus in which R410A has been used as the working fluid, without any particular change of design.

The relative pressure ($RDP_{R410A}$) of the working fluid according to an embodiment is preferably at most 1.000. The lower limit of the relative pressure (RDP$_{R410A}$) of the working fluid according to an embodiment is not particularly limited.

(D) Combustion Lower Limit

The combustion lower limit is the lower limit of the combustion range i.e. the range of the volume concentration (%) of the working fluid based on the entire amount of the working fluid and the air, within which the working fluid mixed with the air can burn under the predetermined conditions. In the present invention, the combustion range is the combustion range measured in accordance with method A in High Pressure Gas Safety Act.

"Measured in accordance with method A in High Pressure Gas Safety Act" includes measurement by method A in High Pressure Gas Safety Act and includes measurement by a measurement method other than method A, for example, by a measurement method modified to such an extent that the modification is acceptable as an alternative to the method A.

In a case where the working fluid consists of a single compound, the combustion lower limit may be literature data by the above-exemplified measurement method. Further, in a case where the working fluid is a mixture, the combustion lower limit may be actually measured by the above-exemplified measurement method, or may be calculated as a weighted average by the molar composition employing the combustion lower limits of the respective compounds constituting the working fluid.

The working fluid according to an embodiment of the present invention has a combustion lower limit of at least 5 vol % as represented by (D-1). When the combustion lower limit of the working fluid according to an embodiment is at least 5 vol %, that is, it satisfies the condition (D-1), even when the working fluid leaks out from a refrigerator or an air-conditioning apparatus, the working fluid is not highly flammable like a hydrocarbon refrigerant such as propane, butane or isobutane in a normal environment, and such a situation can be handled with predetermined measures.

The combustion lower limit of the working fluid according to an embodiment is preferably at least 7%, more preferably at least 10%. Particularly, the working fluid according to an embodiment has no combustion range. In a case where the working fluid according to an embodiment has a combustion range, the upper limit is not particularly limited. However, in order that the working fluid will not be a flammable gas in High Pressure Gas Safety Act, it is preferred that the combustion lower limit is at least 10% and the difference between the upper limit and the lower limit of the combustion range is at least 20%.

(E) Self-Decomposition Property

The working fluid according to an embodiment of the present invention has no self-decomposition property. That is, of the working fluid according to an embodiment, the pressure will not exceed 2.00 MPaG in a combustion test by equipment in accordance with method A for measurement of the combustion range in High Pressure Gas Safety Act under conditions of 0.98 MPaG and 250° C., as defined by (E-1). That is, the working fluid has a property such that the temperature and the pressure are not substantially changed by the combustion test.

By the working fluid according to an embodiment satisfying the condition (E-1), in a heat cycle system such as a refrigerating apparatus or an air-conditioning apparatus, the working fluid can be stably used continuously without any particularly measurements for a long period of time.

The self-decomposition property (E) of the working fluid in the present invention is evaluated specifically as follows using equipment in accordance with method A recommended as equipment for measurement of the combustion range of a gas mixture containing halogen, by individual notifications in High Pressure Gas Safety Act.

A sample (working fluid) is enclosed in a spherical pressure resistant reactor having an internal capacity of 650 cm$^3$ and having a temperature in the interior controlled at a predetermined temperature (250° C.) from the outside, to a predetermined pressure (0.98 MPa by the gauge pressure), and a platinum wire placed in the interior of the reactor is fused to apply an about 30 J energy. The temperature and pressure changes in the pressure resistant reactor generated after application are measured to confirm whether the self-decomposition reaction occurred or not.

In a case where remarkable pressure increase and temperature increase are confirmed after application as compared with before application, the sample (working fluid) is rated as having undergone self-decomposition reaction, that is, as having self-decom position property. On the contrary, in a case where remarkable pressure and temperature increases are not confirmed after application, the sample (working fluid) is rated as not having undergone self-decomposition reaction, that is, as having no self-decom position property.

Further, in the present invention, "there is no remarkable pressure increase from the initial pressure of 0.98 MPaG" means that the pressure after application is within a range of from 0.98 MPaG to 2.00 MPa. Further, "there is no temperature increase from the initial temperature of 250° C." means that the temperature after application is within a range of from 250° C. to 260° C.

The above-described properties of the working fluid according to an embodiment of the present invention are summarized in the following Table 1. In Table 1, the rows represent the physical properties (A) to (E) to be evaluated, and the columns represent physical property values (1) to (4). In Table 1, with respect to the physical properties (A) to (E), the columns (1), (2), (3) and (4) respectively represent an essential requirement, a preferred range, a more preferred range and a particularly preferred range. In Table 1, the range (less than 300) of the column (1) of the row (A) GWP corresponds to the requirement of the above (A-1). Likewise, the ranges of the column (1) of the rows (B) to (E) in Table 1 correspond to the requirements (B-1) to (E-1).

TABLE 1

| Physical properties/conditions | (1) | (2) | (3) | (4) |
|---|---|---|---|---|
| (A) GWP | <300 | ≤250 | ≤200 | ≤150 |
| (B) Relative cycle performance (relative to R410A) | ≥0.820 | ≥0.900 | ≥0.950 | ≥1.000 |
| (C) Relative pressure (RDP$_{R410A}$) | ≤1.100 | ≤1.000 | ≤0.900 | ≤0.820 |
| (D) Combustion lower limit [vol %] | ≥5 | ≥7 | ≥10 | No combustion range |
| (E) Self-decomposition property | Nil | | | |

The working fluid according to an embodiment of the present invention is required to satisfy the conditions (A)-(1), (B)-(1), (C)-(1), (D)-(1) and (E)-(1) in Table 1. So long as the above conditions are satisfied, the combination of the rows (A) to (E) and the respective levels (2) to (4) is not particularly limited. Most preferred is a working fluid which satisfies all the conditions (A)-(4), (B)-(4), (C)-(2), (D)-(4) and (E)-(1).

As the heat cycle system to which the working fluid for heat cycle of the present invention is applied, a heat cycle system by heat exchangers such as a condenser and an evaporator may be used without any particularly restriction. The heat cycle system, for example, a refrigerating cycle, has a mechanism in which a gaseous working fluid is compressed by a compressor and cooled by a condenser to form a high pressure liquid, the pressure of the liquid is lowered by an expansion valve, and the liquid is vaporized at low temperature by an evaporator so that heat is removed by the heat of vaporization.

<Composition of Working Fluid>

The composition of the working fluid for heat cycle of the present invention is not particularly limited so long as all the conditions (A-1) to (E-1) are satisfied. The working fluid may consist of a single compound or may be a mixture. However, no composition which satisfies all the conditions (A-1) to (E-1) by itself has been known. Accordingly, to obtain a working fluid according to an embodiment which satisfies all the conditions (A-1) to (E-1), for example, a method of selecting the combination of compounds constituting the working fluid and adjusting the contents of the selected compounds so as to satisfy the conditions (A-1) to (E-1) as follows, may be mentioned.

The combination of compounds which may constitute the working fluid of the present invention, in order to satisfy the condition (A-1), preferred is a combination of compounds including at least one HFO (a HFC having a carbon-carbon double bond) which intrinsically has a low GWP and which satisfies the condition (A-1) by itself.

The HFO may, for example, be HFO-1123, HFO-1132(Z) which is cis-HFO-1132, HFO-1132(E) which is trans-HFO-1132, 2,3,3,3-tetrafluoropropene (HFO-1234yf), 2-fluoropropene (HFO-1261yf), 1,1,2-trifluoropropene (HFO-1243yc), trans-1,2,3,3,3-pentafluoropropene (HFO-1225ye (E)), cis-1,2,3,3,3-pentafluoropropene (HFO-1225ye(Z)), trans-1,3,3,3-tetrafluoropropene (HFO-1234ze(E)), cis-1,3,3,3-tetrafluoropropene (HFO-1234ze(Z)) or 3,3,3-trifluoropropene (HFO-1243zf).

Preferably, among such HFOs, a compound having a high relative cycle performance, for example, a compound which satisfies the condition (B-1) or a compound which may satisfy the condition of (B-1) by combination with another compound, is selected. Such a compound may, for example, be HFO-1123, HFO-1132(Z) or HFO-1232(E).

Further, GWP of HFO-1123 is 0.3 as a value measured in accordance with Intergovernmental Panel on Climate Change (IPCC), Fourth assessment report. Further, GWPs of HFO-1132(Z) and HFO-1132(E) are not disclosed in IPCC, Fourth assessment report, and can be estimated to be at most 10, from GWP of other HFOs, for example, GWP of 6 of HFO-1234ze(E) and HFO-1234ze(Z) and GWP of 4 of HFO-1234yf.

In Table 2, physical property values for (A) to (E) of HFO-1123, HFO-1132(Z) and HFO-1132(E) together with the conditions (A-1) to (E-1) which the working fluid according to an embodiment should satisfy. Further, physical property values for (A) to (E) of R410A which is to be replaced by the working fluid according to an embodiment are also shown.

TABLE 2

| Compound | GWP | Relative cycle performance (relative to R410A) | Relative pressure ($RDP_{R410A}$) | Combustion lower limit (vol %) | Self-decomposition property |
|---|---|---|---|---|---|
| Working fluid | <300 | ≥0.820 | ≤1.100 | ≥5 | Nil |
| R410A | 2088 | 1.000 | 1.000 | No combustion range | Nil |
| HFO-1123 | 0.3 | 1.056 | 1.242 | 6.3[1)] | Observed |
| HFO-1132(E) | ≤10 | 0.917 | 0.834 | 4[1)] | Observed |
| HFO-1132(Z) | ≤10 | 0.515 | 0.409 | 4[1)] | Observed |

From Table 2, physical properties of HFO-1123, HFO-1132(Z) and HFO-1132(E) which are not satisfied as the working fluid according to an embodiment are known. Considering such physical properties, HFO-1123, HFO-1132(Z) and HFO-1132(E) are combined with a compound so as to achieve physical properties which have not been satisfied as the working fluid according to an embodiment while physical properties which have already been satisfied are kept so as not to be out of the ranges of the working fluid according to an embodiment. Such a compound may, for example, be a HFO other than HFO-1123, HFO-1132(Z) and HFO-1132(E), and a HFC.

The HFO to be combined with HFO-1123, HFO-1132(Z), HFO-1132(E) and the like, is preferably a HFO which has a relative cycle performance at a certain level or higher, which has a low relative pressure ($RDP_{R410A}$), and which has no self-decomposition property. Specifically, it may, for example, be HFO-1234ze(E), HFO-1234ze(Z) or HFO-1234yf.

The HFC is preferably properly selected with a view to keeping particularly GWP within the range (A-1) and the relative cycle performance within the range (B-1) of a mixture with the above HFO as a working fluid.

The HFC may, for example, be HFC-32, difluoroethane, trifluoroethane, tetrafluoroethane, pentafluoroethane (HFC-125), pentafluoropropane, hexafluoropropane, heptafluoropropane, pentafluorobutane or heptafluorocyclopentane. From the above viewpoint, preferred is HFC-32, 1,1-difluoroethane (HFC-152a), 1,1,2,2-tetrafluoroethane (HFC-134) or 1,1,1,2-tetrafluoroethane (HFC-134a).

The HFC to be combined with the above HFO-1123, HFO-1132(Z), HFO-1132(E) and the like, is preferably a HFC which has a relatively low GWP, for example, at most 1,500, which has a high relative cycle performance and/or a low relative pressure ($RDP_{R410A}$), and which has no self-decomposition property. It may, for example, be specifically HFC-32 or HFC-134a, and is particularly preferably HFC-32.

In Table 3, physical property values for (A) to (E) of HFO-1234ze(E), HFO-1234yf, HFC-32 and HFC-134a are shown together with (A-1) to (E-1) which the working fluid according to an embodiment should satisfy. Further, physical property values for (A) to (E) of R410A which is to be replaced by the working fluid according to an embodiment are also shown.

TABLE 3

| Compound | GWP | Relative cycle performance (relative to R410A) | Relative pressure ($RDP_{R410A}$) | Combustion lower limit (vol %) | Self-decomposition property |
|---|---|---|---|---|---|
| Working fluid | <300 | ≥0.820 | ≤1.100 | ≥5 | Nil |
| R410A | 2088 | 1.000 | 1.000 | No combustion range | Nil |
| HFO-1234yf | 4 | 0.441 | 0.427 | 6.3[2] | Nil |
| HFO-1234ze(E) | 6 | 0.364 | 0.327 | 7.0[2] | Nil |
| HFC-32 | 675 | 1.118 | 1.047 | 13.4[1] | Nil |
| HFC-134a | 1430 | 0.481 | 0.427 | No combustion range | Nil |

In Tables 2 and 3, in the column "combustion lower limit", 1) represents a measured value measured in accordance with method A in High Pressure Gas Safety Act, and 2) represents a literature value measured in accordance with method A in High Pressure Gas Safety Act.

Since HFO-1123, HFO-1132(Z) and HFO-1132(E) have self-decomposition property when used by themselves, the proportion of HFO-1123, HFO-1132(Z) or HFO-1132(E) based on the entire amount of the working fluid is such that the working fluid has no self-decomposition property.

As a preferred combination of compounds for the working fluid according to an embodiment which satisfies (A-1) to (E-1), in a case where HFO-1123 is used, the following combinations may be mentioned. In the following description, mass % represents mass % based on 100 mass % of the entire working fluid.

(i-1) From 55 to 62 mass % of HFO-1123 and from 38 to 45 mass % of HFO-1234yf.

(i-2) From 10 to 70 mass % of HFO-1123, from 10 to 50 mass % of HFO-1234yf and from 10 to 40 mass % of HFC-32.

(i-3) From 20 to 50 mass % of HFO-1123, from 20 to 40 mass % of HFO-1234ze(E) and from 10 to 40 mass % of HFC-32.

So long as (A-1) to (E-1) are satisfied, it is possible to combine HFO-1123, HFO-1234yf, HFO-1234ze(E) and HFC-32 in predetermined proportions to obtain the working fluid of the present invention. Further, so long as (A-1) to (E-1) are satisfied, it is possible to combine HFO-1123 with a HFO or HFC not used in the above (i-1) to (i-3) to obtain the working fluid of the present invention.

As a preferred combination of compounds for the working fluid according to an embodiment which satisfies (A-1) to (E-1), in a case where HFO-1132(Z) is used, the following combinations may be mentioned. In the following description, mass % represents mass % based on 100 mass % of the entire working fluid.

(ii-1) From 60 to 70 mass % of HFO-1132(Z) and from 30 to 40 mass % of HFC-32.

(ii-2) From 20 to 40 mass % of HFO-1132(Z), from 20 to 40 mass % of HFO-1234yf and from 40 to 44 mass % of HFC-32.

So long as (A-1) to (E-1) are satisfied, it is possible to combine HFO-1132(Z) with a HFO or HFC not used in the above (ii-1) or (ii-2) to obtain the working fluid of the present invention.

As a preferred combination of compounds for the working fluid according to an embodiment which satisfied (A-1) to (E-1), in a case where HFO-1132(E) is used, the following combinations may be mentioned. In the following description, mass % represents mass % based on 100 mass % of the entire working fluid.

(iii-1) From 60 to 70 mass % of HFO-1132(E) and from 30 to 40 mass % of HFC-32.

(iii-2) From 20 to 70 mass % of HFO-1132(E), from 10 to 40 mass % of HFO-1234yf and from 20 to 40 mass % of HFC-32.

So long as (A-1) to (E-1) are satisfied, it is possible to combine HFO-1132(E) with a HFO or HFC not used in the above (iii-1) to (iii-3) to obtain the working fluid of the present invention.

Further, so long as (A-1) to (E-1) are satisfied, it is possible to combine the above-exemplified mixture of HFO-1123, HFO-1132(Z) or HFO-1132(E) and another HFO or HFC, with still another HFO or HFC.

(Other Component)

The working fluid according to an embodiment may contain, other than the HFO or the HFC, e.g. another component which is vaporized and liquefied together with the HFO or the HFC, as the case requires, so long as (A-1) to (E-1) are satisfied.

Such a component other than the HFO or the HFC (hereinafter referred to as other component) may, for example, be carbon dioxide, a hydrocarbon, a chlorofluoroolefin (CFO), or a hydrochlorofluoroolefin (HCFO). Such another component is preferably a component which has less influence over the ozone layer and which has less influence over global warming.

The hydrocarbon may, for example, be propane, propylene, cyclopropane, butane, isobutane, pentane or isopentane. The hydrocarbon may be used alone or in combination of two or more.

In a case where the working fluid contains a hydrocarbon, its content is less than 10 mass %, preferably from 1 to 5 mass %, more preferably from 3 to 5 mass % per 100 mass % of the working fluid. When the content of the hydrocarbon is at least the lower limit, the solubility of a mineral refrigerant oil in the working fluid will be favorable.

The CFO may, for example, be chlorofluoropropene or chlorofluoroethylene. With a view to suppressing flammability of the working fluid without significantly decreasing the cycle performance of the working fluid, the CFO is preferably 1,1-dichloro-2,3,3,3-tetrafluoropropene (CFO-1214ya), 1,3-dichloro-1,2,3,3-tetrafluoropropene (CFO-1214yb) or 1,2-dichloro-1,2-difluoroethylene (CFO-1112).

The CFO may be used alone or in combination of two or more.

In a case where the working fluid contains the CFO, its content is less than 10 mass %, preferably from 1 to 8 mass %, more preferably from 2 to 5 mass % per 100 mass % of the working fluid. When the content of the CFO is at least the lower limit, the flammability of the working fluid tends to be suppressed. When the content of the CFO is at most the upper limit, favorable cycle performance is likely to be obtained.

The HCFO may, for example, be hydrochlorofluoropropene or hydrochlorofluoroethylene. With a view to suppressing the flammability of the working fluid without significantly decreasing the cycle performance of the working fluid, the HCFO is preferably 1-chloro-2,3,3,3-tetrafluoropropene (HCFO-1224yd) or 1-chloro-1,2-difluoroethylene (HCFO-1122). The HCFO may be used alone or in combination of two or more.

In a case where the working fluid contains the HCFO, the content of the HCFO per 100 mass % of the working fluid is less than 10 mass %, preferably from 1 to 8 mass %, more preferably from 2 to 5 mass %. When the content of the HCFO is at least the lower limit, the flammability of the working fluid tends to be suppressed. When the content of the HCFO is at most the upper limit, favorable cycle performance is likely to be obtained.

In a case where the working fluid used for the composition for a heat cycle system of the present invention contains the above another component, the total content of such another component in the working fluid is less than 10 mass %, preferably at most 8 mass %, more preferably at most 5 mass % per 100 mass % of the working fluid.

[Composition for Heat Cycle System]

The working fluid of the present invention may be used, in application to a heat cycle system, as the composition for a heat cycle system of the present invention usually as mixed with a refrigerant oil. The composition for a heat cycle system of the present invention comprising the working fluid of the present invention and a refrigerant oil may further contain known additives such as a stabilizer and a leak detecting substance.

<Refrigerant Oil>

As a refrigerant oil, a known refrigerant oil which has been used for a composition for a heat cycle system together with a working fluid comprising a halogenated hydrocarbon may be used without any particular restrictions. The refrigerant oil may, for example, be specifically an oxygen-containing synthetic oil (such as an ester refrigerant oil or an ether refrigerant oil), a fluorinated refrigerant oil, a mineral refrigerant oil or a hydrocarbon synthetic oil.

The ester refrigerant oil may, for example, be a dibasic acid ester oil, a polyol ester oil, a complex ester oil or a polyol carbonate oil.

The dibasic acid ester oil is preferably an ester of a $C_{5-10}$ dibasic acid (such as glutaric acid, adipic acid, pimelic acid, suberic acid, azelaic acid or sebacic acid) with a $C_{1-15}$ monohydric alcohol which is linear or has a branched alkyl group (such as methanol, ethanol, propanol, butanol, pentanol, hexanol, heptanol, octanol, nonanol, decanol, undecanol, dodecanol, tridecanol, tetradecanol or pentadecanol). Specifically, ditridecyl glutarate, di(2-ethylhexyl) adipate, diisodecyl adipate, ditridecyl adipate or di(3-ethylhexyl) sebacate may, for example, be mentioned.

The polyol ester oil is preferably an ester of a diol (such as ethylene glycol, 1,3-propanediol, propylene glycol, 1,4-butanediol, 1,2-butanediol, 1,5-pentadiol, neopentyl glycol, 1,7-heptanediol or 1,12-dodecanediol) or a polyol having from 3 to 20 hydroxy groups (such as trimethylolethane, trimethylolpropane, trimethylolbutane, pentaerythritol, glycerin, sorbitol, sorbitan or a sorbitol/glycerin condensate) with a $C_{6-20}$ fatty acid (such as a linear or branched fatty acid such as hexanoic acid, heptanoic acid, octanoic acid, nonanoic acid, decanoic acid, undecanoic acid, dodecanoic acid, eicosanoic acid or oleic acid, or a so-called neo acid having a quaternary a carbon atom).

The polyol ester oil may have a free hydroxy group.

The polyol ester oil is preferably an ester (such as trimethylolpropane tripelargonate, pentaerythritol 2-ethylhexanoate or pentaerythritol tetrapelargonate) of a hindered alcohol (such as neopentyl glycol, trimethylolethane, trimethylolpropane, trimethylolbutane or pentaerythritol).

The complex ester oil is an ester of a fatty acid and a dibasic acid, with a monohydric alcohol and a polyol. The fatty acid, the dibasic acid, the monohydric alcohol and the polyol may be as defined above.

The polyol carbonate oil is an ester of carbonic acid with a polyol.

The polyol may be the above-described diol or the above-described polyol. Further, the polyol carbonate oil may be a ring-opening polymer of a cyclic alkylene carbonate.

The ether refrigerant oil may be a polyvinyl ether oil or a polyoxyalkylene oil.

The polyvinyl ether oil may be one obtained by polymerizing a vinyl ether monomer such as an alkyl vinyl ether, or a copolymer obtained by copolymerizing a vinyl ether monomer and a hydrocarbon monomer having an olefinic double bond.

The vinyl ether monomer may be used alone or in combination of two or more.

The hydrocarbon monomer having an olefinic double bond may, for example, be ethylene, propylene, various forms of butene, various forms of pentene, various forms of hexene, various forms of heptene, various forms of octene, diisobutylene, triisobutylene, styrene, α-methylstyrene or alkyl-substituted styrene. The hydrocarbon monomer having an olefinic double bond may be used alone or in combination of two or more.

The polyvinyl ether copolymer may be either of a block copolymer and a random copolymer. The polyvinyl ether oil may be used alone or in combination of two or more.

The polyoxyalkylene oil may, for example, be a polyoxyalkylene monool, a polyoxyalkylene polyol, an alkyl ether of a polyoxyalkylene monool or a polyoxyalkylene polyol, or an ester of a polyoxyalkylene monool or a polyoxyalkylene polyol.

The polyoxyalkylene monool or the polyoxyalkylene polyol may be one obtained by e.g. a method of subjecting a $C_{2-4}$ alkylene oxide (such as ethylene oxide or propylene oxide) to ring-opening addition polymerization to an initiator such as water or a hydroxy group-containing compound in the presence of a catalyst such as an alkali hydroxide. Further, one molecule of the polyoxyalkylene chain may contain single oxyalkylene units or two or more types of oxyalkylene units. It is preferred that at least oxypropylene units are contained in one molecule.

The initiator to be used for the reaction may, for example, be water, a monohydric alcohol such as methanol or butanol, or a polyhydric alcohol such as ethylene glycol, propylene glycol, pentaerythritol or glycerol.

The polyoxyalkylene oil is preferably an alkyl ether or ester of a polyoxyalkylene monool or polyoxyalkylene polyol. Further, the polyoxyalkylene polyol is preferably a polyoxyalkylene glycol. Particularly preferred is an alkyl ether of a polyoxyalkylene glycol having the terminal hydroxy group of the polyoxyalkylene glycol capped with an alkyl group such as a methyl group, which is called a polyglycol oil.

The fluorinated refrigerant oil may, for example, be a compound having hydrogen atoms of a synthetic oil (such as the after-mentioned mineral oil, poly-α-olefin, alkylbenzene or alkylnaphthalene) substituted by fluorine atoms, a perfluoropolyether oil or a fluorinated silicone oil.

The mineral refrigerant oil may, for example, be a naphthene mineral oil or a paraffin mineral oil obtained by purifying a refrigerant oil fraction obtained by atmospheric distillation or vacuum distillation of crude oil by a purification treatment (such as solvent deasphalting, solvent extraction, hydrocracking, solvent dewaxing, catalytic dewaxing, hydrotreating or clay treatment) optionally in combination.

The hydrocarbon synthetic oil may, for example, be a poly-α-olefin, an alkylbenzene or an alkylnaphthalene.

The refrigerant oil may be used alone or in combination of two or more.

The refrigerant oil is preferably at least one member selected from a polyol ester oil, a polyvinyl ether oil and a polyglycol oil in view of compatibility with the working fluid.

The content of the refrigerant oil in the composition for a heat cycle system is not limited within a range not to remarkably decrease the effects of the present invention, and is preferably from 10 to 100 parts by mass, more preferably from 20 to 50 parts by mass, per 100 parts by mass of the working fluid.

<Other Optional Component>

The stabilizer optionally contained in the composition for a heat cycle system is a component which improves the stability of the working fluid against heat and oxidation. As the stabilizer, a known stabilizer which has been used for a heat cycle system together with a working fluid comprising a halogenated hydrocarbon, for example, an oxidation resistance-improving agent, a heat resistance-improving agent or a metal deactivator, may be used without any particular restrictions.

The oxidation resistance-improving agent and the heat resistance-improving agent may, for example, be N,N'-diphenylphenylenediamine, p-octyldiphenylamine, p,p'-dioctyldiphenylamine, N-phenyl-1-naphthylamine, N-phenyl-2-naphthylamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2,6-di-(t-butyl)phenol or 4,4'-methylenebis(2,6-di-t-butylphenol). Each of the oxidation resistance-improving agent and the heat resistance-improving agent may be used alone or in combination of two or more.

The metal deactivator may, for example, be imidazole, benzimidazole, 2-mercaptobenzothiazole, 2,5-dimercaptothiadiazole, salicylidene-propylenediamine, pyrazole, benzotriazole, tritriazole, 2-methylbenzamidazole, 3,5-dimethylpyrazole, methylenebis-benzotriazole, an organic acid or an ester thereof, a primary, secondary or tertiary aliphatic amine, an amine salt of an organic acid or inorganic acid, a heterocyclic nitrogen-containing compound, an amine salt of an alkyl phosphate, or a derivative thereof.

The content of the stabilizer in the composition for a heat cycle system is not limited within a range not to remarkably decrease the effects of the present invention, and is preferably at most 5 parts by mass, more preferably at most 1 part by mass per 100 parts by mass of the working fluid.

The leak detecting substance optionally contained in the composition for a heat cycle system may, for example, be an ultraviolet fluorescent dye, an odor gas or an odor masking agent.

The ultraviolet fluorescent dye may be known ultraviolet fluorescent dyes which have been used for a heat cycle system together with a working fluid comprising a halogenated hydrocarbon, such as dyes as disclosed in e.g. U.S. Pat. No. 4,249,412, JP-A-10-502737, JP-A-2007-511645, JP-A-2008-500437 and JP-A-2008-531836.

The odor masking agent may be known perfumes which have been used for a heat cycle system together with a working fluid comprising a halogenated hydrocarbon, such as perfumes as disclosed in e.g. JP-A-2008-500437 and JP-A-2008-531836.

In a case where the leak detecting substance is used, a solubilizing agent which improves the solubility of the leak detecting substance in the working fluid may be used.

The solubilizing agent may be ones as disclosed in e.g. JP-A-2007-511645, JP-A-2008-500437 and JP-A-2008-531836.

The content of the leak detecting substance in the composition for a heat cycle system is not particularly limited within a range not to remarkably decrease the effects of the present invention, and is preferably at most 2 parts by mass, more preferably at most 0.5 part by mass per 100 parts by mass of the working fluid.

[Heat Cycle System]

The heat cycle system of the present invention is a system employing the composition for a heat cycle system of the present invention. The heat cycle system of the present invention may be a heat pump system utilizing heat obtained by a condenser or may be a refrigerating cycle system utilizing coldness obtained by an evaporator.

The heat cycle system of the present invention may, for example, be specifically a refrigerator, an air-conditioning apparatus, a power generation system, a heat transfer apparatus and a secondary cooling machine. Among them, the heat cycle system of the present invention, which stably and safely exhibits heat cycle performance in a working environment at higher temperature, is preferably employed as an air-conditioning apparatus to be disposed outdoors in many cases. Further, the heat cycle system of the present invention is preferably employed also for a refrigerating apparatus.

The air-conditioning apparatus may, for example, be specifically a room air-conditioner, a package air-conditioner (such as a store package air-conditioner, a building package air-conditioner or a plant package air-condition, a gas engine heat pump, a train air-conditioning system or an automobile air-conditioning system.

The refrigerator may, for example, be specifically a showcase (such as a built-in showcase or a separate showcase), an industrial fridge freezer, a vending machine or an ice making machine.

The power generation system is preferably a power generation system by Rankine cycle system.

The power generation system may, for example, be specifically a system wherein in an evaporator, a working fluid is heated by e.g. geothermal energy, solar heat or waste heat in a medium-to-high temperature range at a level of from 50 to 200° C., and the vaporized working fluid in a high temperature and high pressure state is adiabatically expanded by an expansion device, so that a power generator is driven by the work generated by the adiabatic expansion to carry out power generation.

Further, the heat cycle system of the present invention may be a heat transport apparatus. The heat transport apparatus is preferably a latent heat transport apparatus.

The latent heat transport apparatus may, for example, be a heat pipe conducting latent heat transport utilizing evaporation, boiling, condensation, etc. of a working fluid filled in an apparatus, and a two-phase closed thermosiphon. A heat pipe is applied to a relatively small-sized cooling apparatus such as a cooling apparatus of a heating portion of a semiconductor device and electronic equipment. A two-phase closed thermosiphon is widely used for a gas/gas heat exchanger, to accelerate snow melting and to prevent freezing of roads, since it does not require a wick and its structure is simple.

At the time of operation of the heat cycle system, in order to avoid drawbacks due to inclusion of moisture or inclusion of non-condensing gas such as oxygen, it is preferred to provide a means to suppress such inclusion.

If moisture is included in the heat cycle system, a problem may occur particularly when the heat cycle system is used at low temperature. For example, problems such as freezing in a capillary tube, hydrolysis of the working fluid or the refrigerant oil, deterioration of materials by an acid component formed in the cycle, formation of contaminants, etc. may arise. Particularly, if the refrigerant oil is a polyglycol oil or a polyol ester oil, it has extremely high moisture absorbing properties and is likely to undergo hydrolysis, and inclusion of moisture decreases properties of the refrigerant oil and may be a great cause to impair the long term reliability of a compressor. Accordingly, in order to suppress hydrolysis of the refrigerant oil, it is necessary to control the moisture concentration in the heat cycle system.

As a method of controlling the moisture concentration in the heat cycle system, a method of using a moisture-removing means such as a desiccating agent (such as silica gel, activated aluminum or zeolite) may be mentioned. The desiccating agent is preferably brought into contact with the composition for a heat cycle system in a liquid state, in view of the dehydration efficiency. For example, the desiccating agent is located at the outlet of the condenser 12 or at the inlet of the evaporator 14 to be brought into contact with the composition for a heat cycle system.

The desiccating agent is preferably a zeolite desiccating agent in view of chemical reactivity of the desiccating agent and the composition for a heat cycle system, and the moisture absorption capacity of the desiccating agent.

The zeolite desiccating agent is, in a case where a refrigerant oil having a large moisture absorption as compared with a conventional mineral refrigerant oil is used, preferably a zeolite desiccating agent containing a compound represented by the following formula (3) as the main component in view of excellent moisture absorption capacity.

$$M_{2/n}O \cdot Al_2O_3 \cdot xSiO_2 \cdot yH_2O \tag{3}$$

wherein M is a group 1 element such as Na or K or a group 2 element such as Ca, n is the valence of M, and x and y are values determined by the crystal structure. The pore size can be adjusted by changing M.

To select the desiccating agent, the pore size and the fracture strength are important.

In a case where a desiccating agent having a pore size larger than the molecular size of the working fluid contained in the composition for a heat cycle system is used, the working fluid is adsorbed in the desiccating agent and as a result, chemical reaction between the working fluid and the desiccating agent will occur, thus leading to undesired phenomena such as formation of non-condensing gas, a decrease in the strength of the desiccating agent, and a decrease in the adsorption capacity.

Accordingly, it is preferred to use as the desiccating agent a zeolite desiccating agent having a small pore size. Particularly preferred is sodium/potassium type A synthetic zeolite having a pore size of at most 3.5 Å. By using a sodium/potassium type A synthetic zeolite having a pore size smaller than the molecular size of the working fluid, it is possible to selectively adsorb and remove only moisture in the heat cycle system without adsorbing the working fluid. In other words, the working fluid is less likely to be adsorbed in the desiccating agent, whereby heat decomposition is less likely to occur and as a result, deterioration of materials constituting the heat cycle system and formation of contaminants can be suppressed.

The size of the zeolite desiccating agent is preferably from about 0.5 to about 5 mm, since if it is too small, a valve or a thin portion in pipelines of the heat cycle system may be clogged, and if it is too large, the drying capacity will be decreased. Its shape is preferably granular or cylindrical.

The zeolite desiccating agent may be formed into an optional shape by solidifying powdery zeolite by a binding agent (such as bentonite). So long as the desiccating agent is composed mainly of the zeolite desiccating agent, other desiccating agent (such as silica gel or activated alumina) may be used in combination.

The proportion of the zeolite desiccating agent based on the composition for a heat cycle system is not particularly limited.

If non-condensing gas is included in the heat cycle system, it has adverse effects such as heat transfer failure in the condenser or the evaporator and an increase in the working pressure, and it is necessary to suppress its inclusion as far as possible. Particularly, oxygen which is one of non-condensing gases reacts with the working fluid or the refrigerant oil and promotes their decomposition.

The non-condensing gas concentration is preferably at most 1.5 vol %, particularly preferably at most 0.5 vol % by the volume ratio based on the working fluid, in a gaseous phase of the working fluid.

According to the above-described heat cycle system of the present invention, which employs the working fluid of the present invention having high safety, practically sufficient heat cycle performance can be obtained while suppressing influence over global warming, and there is substantially no problem with respect to the temperature glide.

EXAMPLES

Now, the present invention will be described in further detail with reference to Examples. However, it should be understood that the present invention is by no means restricted to specific Examples.

In the following Examples of the present invention and Comparative Examples, GWP and the combustion lower limit were obtained by calculation using values of the respective compounds by themselves respectively in accordance with the above methods. As the values of the respective compounds by themselves, values in the above Tables 2 and 3 and the following Table 4 were employed.

TABLE 4

| Compound | GWP | Combustion range Combustion lower limit (vol %) | Reference source |
|---|---|---|---|
| HFO-1243zf | 9 | 4.7 | Known value by method A |
| HCFO-1122 | <10 | 13 | Measured value by method A |
| HCFO-1224yd | <10 | No combustion range | Measured value by method A |
| Propane | 3 | 2.1 | Known value by method A |
| Butane | 8.4 | 1.8 | Known value by method A |
| Isobutane | 8.4 | 1.8 | Known value by method A |

Examples 1 to 22

In Examples 1 to 22, a working fluid having HFO-1123 and at least one member of HFO-1234yf, HFC-32 and HFO-1234ze(E) mixed in a proportion as identified in Tables 5 to 7 was prepared, and by the above methods, (A) GWP, (B) relative cycle performance (relative to R410A), (C) relative pressure ($RDP_{R410A}$), (D) combustion lower limit and (E) self-decomposition property were measured, calculated and evaluated. The results are shown in Tables 5 to 7.

TABLE 5

| | Working fluid composition [mass %] | | | Properties | | | |
|---|---|---|---|---|---|---|---|
| Example | HFO-1123 | HFO-1234yf | GWP | Relative cycle performance | Relative pressure | Combustion lower limit (vol %) | Self-decomposition property |
| 1 | 60 | 40 | 2 | 0.845 | 0.934 | 6.3 | Nil |

TABLE 6

| | Working fluid composition [mass %] | | | | Properties | | | |
|---|---|---|---|---|---|---|---|---|
| Example | HFO-1123 | HFO-1234yf | HFC-32 | GWP | Relative cycle performance | Relative pressure | Combustion lower limit (vol %) | Self-decomposition property |
| 2 | 60 | 30 | 10 | 69 | 0.924 | 1.018 | 6.9 | Nil |
| 3 | 50 | 40 | 10 | 69 | 0.870 | 0.933 | 6.9 | Nil |
| 4 | 70 | 10 | 20 | 136 | 1.056 | 1.178 | 7.4 | Nil |
| 5 | 50 | 30 | 20 | 136 | 0.944 | 1.010 | 7.5 | Nil |
| 6 | 40 | 40 | 20 | 137 | 0.889 | 0.925 | 7.6 | Nil |
| 7 | 30 | 50 | 20 | 137 | 0.832 | 0.841 | 7.6 | Nil |
| 8 | 40 | 30 | 30 | 204 | 0.959 | 0.996 | 8.2 | Nil |
| 9 | 30 | 40 | 30 | 204 | 0.902 | 0.912 | 8.2 | Nil |
| 10 | 20 | 50 | 30 | 205 | 0.842 | 0.829 | 8.3 | Nil |
| 11 | 40 | 20 | 40 | 271 | 1.025 | 1.061 | 8.8 | Nil |
| 12 | 30 | 30 | 40 | 271 | 0.968 | 0.978 | 8.9 | Nil |
| 13 | 20 | 40 | 40 | 272 | 0.909 | 0.894 | 9.0 | Nil |
| 14 | 10 | 50 | 40 | 272 | 0.846 | 0.812 | 9.1 | Nil |

TABLE 7

| | Working fluid composition [mass %] | | | | Properties | | | |
|---|---|---|---|---|---|---|---|---|
| Example | HFO-1123 | HFO-1234ze(E) | HFC-32 | GWP | Relative cycle performance | Relative pressure | Combustion lower limit (vol %) | Self-decomposition property |
| 15 | 50 | 40 | 10 | 70 | 0.832 | 0.842 | 7.1 | Nil |
| 16 | 50 | 30 | 20 | 137 | 0.909 | 0.940 | 7.7 | Nil |
| 17 | 40 | 40 | 20 | 138 | 0.849 | 0.845 | 7.8 | Nil |
| 18 | 40 | 30 | 30 | 204 | 0.923 | 0.934 | 8.4 | Nil |
| 19 | 30 | 40 | 30 | 205 | 0.861 | 0.840 | 8.6 | Nil |
| 20 | 40 | 20 | 40 | 271 | 0.996 | 1.020 | 9.0 | Nil |
| 21 | 30 | 30 | 40 | 272 | 0.931 | 0.923 | 9.1 | Nil |
| 22 | 20 | 40 | 40 | 272 | 0.867 | 0.831 | 9.3 | Nil |

Examples 23 to 26

In Examples 23 to 26, a working fluid having HFO-1132(Z) and at least one of HFO-1234yf and HFC-32 mixed in a proportion as identified in Tables 8 and 9 was prepared, and by the above methods, (A) GWP, (B) relative cycle performance (relative to R410A), (C) relative pressure ($RDP_{R410A}$), (D) combustion lower limit and (E) self-decomposition property were measured, calculated and evaluated. The results are shown in Tables 8 and 9.

TABLE 8

| Example | Working fluid composition [mass %] | | GWP | Relative cycle performance | Relative pressure | Combustion lower limit (vol %) | Self-decomposition property |
|---|---|---|---|---|---|---|---|
| | HFO-1132(Z) | HFC-32 | | | | | |
| 23 | 70 | 30 | 210 | 1.041 | 1.010 | 5.3 | Nil |
| 24 | 60 | 40 | 276 | 1.072 | 1.048 | 5.8 | Nil |

TABLE 9

| Example | Working fluid composition [mass %] | | | GWP | Relative cycle performance | Relative pressure | Combustion lower limit (vol %) | Self-decomposition property |
|---|---|---|---|---|---|---|---|---|
| | HFO-1132(Z) | HFC-32 | HFO-1234yf | | | | | |
| 25 | 20 | 40 | 40 | 274 | 0.820 | 0.869 | 7.5 | Nil |
| 26 | 40 | 40 | 20 | 275 | 0.827 | 0.976 | 6.5 | Nil |

Examples 27 to 34

In Examples 27 to 34, a working fluid having HFO-1132(E) and at least one of HFO-1234yf and HFC-32 mixed in a proportion as identified in Tables 10 and 11 was prepared, and by the above methods, (A) GWP, (B) relative cycle performance (relative to R410A), (C) relative pressure ($RDP_{R410A}$), (D) combustion lower limit and (E) self-decomposition property were measured, calculated and evaluated. The results are shown in Tables 10 and 11.

TABLE 10

| Example | Working fluid composition [mass %] | | GWP | Relative cycle performance | Relative pressure | Combustion lower limit (vol %) | Self-decomposition property |
|---|---|---|---|---|---|---|---|
| | HFO-1132(E) | HFC-32 | | | | | |
| 27 | 70 | 30 | 210 | 1.041 | 0.633 | 5.3 | Nil |
| 28 | 60 | 40 | 276 | 1.072 | 0.703 | 5.8 | Nil |

TABLE 11

| Example | Working fluid composition [mass %] | | | GWP | Relative cycle performance | Relative pressure | Combustion lower limit (vol %) | Self-decomposition property |
|---|---|---|---|---|---|---|---|---|
| | HFO-1132(E) | HFC-32 | HFO-1234yf | | | | | |
| 29 | 20 | 40 | 40 | 274 | 0.896 | 0.753 | 7.5 | Nil |
| 30 | 40 | 20 | 40 | 141 | 0.858 | 0.620 | 5.7 | Nil |
| 31 | 40 | 40 | 20 | 275 | 0.992 | 0.738 | 6.5 | Nil |
| 32 | 60 | 20 | 20 | 142 | 0.945 | 0.595 | 5.1 | Nil |
| 33 | 60 | 30 | 10 | 209 | 1.011 | 0.651 | 5.5 | Nil |
| 34 | 70 | 20 | 10 | 142 | 0.979 | 0.579 | 5.0 | Nil |

Comparative Examples 1 to 54

In Comparative Examples 1 to 54, a working fluid having at least one HFO, and at least one of another HFO, a HFC, a hydrocarbon and a HCFO mixed in a proportion as identified in Tables 12 to 20, was prepared, and by the above methods, (A) GWP, (B) relative cycle performance (relative to R410A), (C) relative pressure ($RDP_{R410A}$), (D) combustion lower limit and (E) self-decomposition property were measured, calculated and evaluated. The results are shown in Tables 12 to 20.

TABLE 12

| Comparative Example | Working fluid composition [mass %] | | Properties | | | | |
|---|---|---|---|---|---|---|---|
| | HFO-1123 | HFC-32 | GWP | Relative cycle performance | Relative pressure | Combustion lower limit (vol %) | Self-decomposition property |
| 1 | 90 | 10 | 68 | 1.085 | 1.256 | 6.8 | Observed |
| 2 | 80 | 20 | 135 | 1.109 | 1.256 | 7.4 | Observed |
| 3 | 70 | 30 | 203 | 1.128 | 1.246 | 8.0 | Nil |
| 4 | 60 | 40 | 270 | 1.141 | 1.227 | 8.6 | Nil |
| 5 | 50 | 50 | 338 | 1.148 | 1.204 | 9.3 | Nil |
| 6 | 40 | 60 | 405 | 1.150 | 1.176 | 10.0 | Nil |
| 7 | 30 | 70 | 473 | 1.147 | 1.146 | 10.8 | Nil |
| 8 | 20 | 80 | 540 | 1.141 | 1.114 | 11.6 | Nil |
| 9 | 10 | 90 | 608 | 1.131 | 1.081 | 12.5 | Nil |

TABLE 13

| Comparative Example | Working fluid composition [mass %] | | Properties | | | | |
|---|---|---|---|---|---|---|---|
| | HFO-1123 | HFO-1234ze(E) | GWP | Relative cycle performance | Relative pressure | Combustion lower limit (vol %) | Self-decomposition property |
| 10 | 90 | 10 | 1 | 0.992 | 1.138 | 6.3 | Observed |
| 11 | 80 | 20 | 1 | 0.927 | 1.033 | 6.4 | Observed |
| 12 | 70 | 30 | 2 | 0.866 | 0.93 | 6.5 | Observed |
| 13 | 60 | 40 | 3 | 0.808 | 0.832 | 6.5 | Nil |
| 14 | 50 | 50 | 3 | 0.750 | 0.739 | 6.6 | Nil |
| 15 | 40 | 60 | 4 | 0.685 | 0.653 | 6.6 | Nil |
| 16 | 30 | 70 | 4 | 0.611 | 0.570 | 6.7 | Nil |
| 17 | 20 | 80 | 5 | 0.529 | 0.490 | 6.8 | Nil |
| 18 | 10 | 90 | 5 | 0.443 | 0.410 | 6.9 | Nil |
| 19 | 8 | 92 | 6 | 0.427 | 0.394 | 6.9 | Nil |
| 20 | 6 | 94 | 6 | 0.410 | 0.377 | 6.9 | Nil |
| 21 | 4 | 96 | 6 | 0.394 | 0.361 | 7.0 | Nil |
| 22 | 2 | 98 | 6 | 0.379 | 0.344 | 7.0 | Nil |

TABLE 14

| Comparative Example | Working fluid composition [mass %] | | Properties | | | | |
|---|---|---|---|---|---|---|---|
| | HFO-1234yf | HFC-32 | GWP | Relative cycle performance | Relative pressure | Combustion lower limit (vol %) | Self-decomposition property |
| 23 | 90 | 10 | 71 | 0.538 | 0.513 | 6.8 | Nil |
| 24 | 80 | 20 | 138 | 0.628 | 0.591 | 7.4 | Nil |
| 25 | 70 | 30 | 205 | 0.708 | 0.663 | 8.0 | Nil |
| 26 | 60 | 40 | 272 | 0.780 | 0.730 | 8.6 | Nil |
| 27 | 50 | 50 | 340 | 0.846 | 0.792 | 9.3 | Nil |
| 28 | 40 | 60 | 407 | 0.907 | 0.851 | 10.0 | Nil |
| 29 | 30 | 70 | 474 | 0.965 | 0.905 | 10.8 | Nil |
| 30 | 20 | 80 | 541 | 1.020 | 0.956 | 11.6 | Nil |
| 31 | 10 | 90 | 608 | 1.071 | 1.003 | 12.5 | Nil |

TABLE 15

| Comparative Example | Working fluid composition [mass %] | | Properties | | | | |
|---|---|---|---|---|---|---|---|
| | HFO-1234ze(E) | HFC-32 | GWP | Relative cycle performance | Relative pressure | Combustion lower limit (vol %) | Self-decomposition property |
| 32 | 98 | 2 | 19 | 0.384 | 0.347 | 7.1 | Nil |
| 33 | 96 | 4 | 33 | 0.406 | 0.366 | 7.3 | Nil |

TABLE 15-continued

| Comparative Example | Working fluid composition [mass %] | | Properties | | | |
|---|---|---|---|---|---|---|
| | HFO-1234ze(E) | HFC-32 | GWP | Relative cycle performance | Relative pressure | Combustion lower limit (vol %) | Self-decomposition property |
| 34 | 94 | 6 | 46 | 0.427 | 0.385 | 7.4 | Nil |
| 35 | 92 | 8 | 60 | 0.448 | 0.403 | 7.6 | Nil |
| 36 | 90 | 10 | 73 | 0.469 | 0.421 | 7.7 | Nil |
| 37 | 80 | 20 | 140 | 0.568 | 0.506 | 8.4 | Nil |
| 38 | 70 | 30 | 207 | 0.655 | 0.585 | 9.1 | Nil |
| 39 | 60 | 40 | 274 | 0.732 | 0.660 | 9.8 | Nil |
| 40 | 50 | 50 | 341 | 0.801 | 0.732 | 10.4 | Nil |
| 41 | 40 | 60 | 407 | 0.867 | 0.801 | 11.0 | Nil |
| 42 | 30 | 70 | 474 | 0.931 | 0.868 | 11.7 | Nil |
| 43 | 20 | 80 | 541 | 0.995 | 0.931 | 12.3 | Nil |
| 44 | 10 | 90 | 608 | 1.059 | 0.991 | 12.8 | Nil |

TABLE 16

| Comparative Example | Working fluid composition [mass %] | | Properties | | | |
|---|---|---|---|---|---|---|
| | HFO-1123 | Propane | GWP | Relative cycle performance | Relative pressure | Combustion lower limit (vol %) | Self-decomposition property |
| 45 | 90 | 10 | 0 | 0.854 | 1.154 | 5.58 | Observed |
| 46 | 80 | 20 | 0 | 0.824 | 1.059 | 4.97 | Nil |

TABLE 17

| Comparative Example | Working fluid composition [mass %] | | Properties | | | |
|---|---|---|---|---|---|---|
| | HFO-1123 | Butane | GWP | Relative cycle performance | Relative pressure | Combustion lower limit (vol %) | Self-decomposition property |
| 47 | 80 | 20 | 0 | 0.648 | 0.749 | 5.12 | Observed |
| 48 | 60 | 40 | 0 | 0.462 | 0.510 | 4.12 | Nil |

TABLE 18

| Comparative Example | Working fluid composition [mass %] | | Properties | | | |
|---|---|---|---|---|---|---|
| | HFO-1123 | Isobutane | GWP | Relative cycle performance | Relative pressure | Combustion lower limit (vol %) | Self-decomposition property |
| 49 | 80 | 20 | 0 | 0.696 | 0.846 | 5.12 | Observed |
| 50 | 60 | 40 | 0 | 0.572 | 0.599 | 4.12 | Nil |

TABLE 19

| Comparative Example | Working fluid composition [mass %] | | Properties | | | |
|---|---|---|---|---|---|---|
| | HFO-1123 | HFO-1243zf | GWP | Relative cycle performance | Relative pressure | Combustion lower limit (vol %) | Self-decomposition property |
| 51 | 80 | 20 | 0 | 0.696 | 1.097 | 6.02 | Observed |
| 52 | 60 | 40 | 0 | 0.729 | 0.921 | 5.72 | Nil |

TABLE 20

| Comparative Example | Working fluid composition [mass %] | | | Properties | | | |
|---|---|---|---|---|---|---|---|
| | HFO-1123 | HFO-1122 | GWP | Relative cycle performance | Relative pressure | Combustion lower limit (vol %) | Self-decomposition property |
| 53 | 60 | 20 | 0 | 0.639 | 0.744 | 7.7 | Observed |
| 54 | 40 | 40 | 0 | 0.525 | 0.561 | 8.8 | Nil |

INDUSTRIAL APPLICABILITY

The composition for a heat cycle system of the present invention and the heat cycle system using the composition, are useful for a refrigerator (such as a built-in showcase, a separate showcase, an industrial fridge freezer, a vending machine or an ice making machine), an air-conditioning apparatus (such as a room air-conditioner, a store package air-conditioner, a building package air-conditioner, a plant package air-conditioner, a gas engine heat pump, a train air-conditioning system or an automobile air-conditioning system), power generation system (such as exhaust heat recovery power generation) or a heat transport apparatus (such as a heat pipe).

This application is a continuation of PCT Application No. PCT/JP2015/051409, filed on Jan. 20, 2015, which is based upon and claims the benefit of priorities from Japanese Patent Application No. 2014-017031 filed on Jan. 31, 2014, Japanese Patent Application No. 2014-017967 filed on Jan. 31, 2014, Japanese Patent Application No. 2014-030856 filed on Feb. 20, 2014, Japanese Patent Application No. 2014-030857 filed on Feb. 20, 2014, Japanese Patent Application No. 2014-033345 filed on Feb. 24, 2014, Japanese Patent Application No. 2014-053765 filed on Mar. 17, 2014, Japanese Patent Application No. 2014-055603 filed on Mar. 18, 2014, Japanese Patent Application No. 2014-118163 filed on Jun. 6, 2014, Japanese Patent Application No. 2014-118164 filed on Jun. 6, 2014, Japanese Patent Application No. 2014-118165 filed on Jun. 6, 2014, Japanese Patent Application No. 2014-118166 filed on Jun. 6, 2014, Japanese Patent Application No. 2014-118167 filed on Jun. 6, 2014, Japanese Patent Application No. 2014-127744 filed on Jun. 20, 2014, Japanese Patent Application No. 2014-127745 filed on Jun. 20, 2014, Japanese Patent Application No. 2014-148347 filed on Jul. 18, 2014, Japanese Patent Application No. 2014-148348 filed on Jul. 18, 2014, Japanese Patent Application No. 2014-148350 filed on Jul. 18, 2014, Japanese Patent Application No. 2014-187002 filed on Sep. 12, 2014, Japanese Patent Application No. 2014-187003 filed on Sep. 12, 2014, Japanese Patent Application No. 2014-187004 filed on Sep. 12, 2014, Japanese Patent Application No. 2014-187005 filed on Sep. 12, 2014 and Japanese Patent Application No. 2014-187006 filed on Sep. 12, 2014. The contents of those applications are incorporated herein by reference in their entireties.

REFERENCE SYMBOLS

10: Refrigerating cycle system, 11: compressor, 12: condenser, 13: expansion valve, 14: evaporator, 15, 16: pump.

What is claimed is:

1. A working fluid for heat cycle, the working fluid comprising:

1,1,2-trifluoroethylene (HFO-1123); and
at least one selected from the group consisting of trans-1,3,3,3,-tetrafluoropropene (HFO-1234ze(E)), cis-1,3,3,3,-tetrafluoropropene (HFO-1234ze(Z)), 2,3,3,3-tetrafluoropropene (HFO-1234yf), and difluoromethane (HFC-32), wherein the working fluid satisfies the following properties (A-1) to (E-1):

(A-1): the global warming potential (100 years) in Intergovernmental Panel on Climate Change (IPCC), Fourth assessment report, is at most 200;

(B-1): the product of the relative refrigerating capacity ($RQ_{R410A}$) calculated in accordance with the following formula (X) and the relative coefficient of performance ($RCOP_{R410A}$) calculated in accordance with the following formula (Y) is at least 0.820:

$$\text{Relative refrigerating capacity } (RQ_{R410A}) = \frac{\text{Refrigerating capacity of sample } (Q_{sample})}{\text{Refrigerating capacity of } R410A \ (Q_{R410A})} \quad (X)$$

$$\text{Relative performance of coefficient } (RCOP_{R410A}) = \frac{\text{Coefficient of performance of sample } (COP_{sample})}{\text{Coefficient of performance of } R410A \ (COP_{R410A})} \quad (Y)$$

wherein R410A is a mixture of difluoromethane and pentafluoroethane in a mass ratio of 1:1, and the sample is a working fluid to be subjected to relative evaluation; the refrigerating capacity of each of the sample and R410A is an output (kW) when a standard refrigerating cycle is operated under the following temperature conditions (T) using each of the sample and R410A; and the coefficient of performance of each of the sample and R410A is a value obtained by dividing the above output (kW) by the power consumption (kW) required for the above operation using each of the sample and R410A;

[Temperature conditions (T)]

the evaporation temperature is 0° C., provided that in the case of a non-azeotropic mixture, the evaporation temperature is the average temperature of the evaporation initiation temperature and the evaporation completion temperature, the condensing temperature is 40° C., provided that in the case of a non-azeotropic mixture, the condensing temperature is the average temperature of the condensation initiation temperature and the condensation completion temperature, the supercooling degree (SC) is 5° C., and the degree of superheat (SH) is 5° C.;

(C-1): the relative pressure ($RDP_{R410A}$) calculated in accordance with the following formula (Z) is at most 1.100:

$$\text{Relative pressure } (RDP_{R410A}) = \frac{\text{Compressor discharge gas pressure of sample } (DP_{sample})}{\text{Compressor discharge gas pressure of } R410A \ (DP_{R410A})} \quad (Z)$$

wherein R410A is a mixture of difluoromethane and pentafluoroethane in a mass ratio of 1:1, and the sample is a working fluid to be subjected to relative evaluation; the compressor discharge gas pressure of each of the sample and R410A is a compressor discharge gas pressure when a standard refrigerating cycle is operated under the above temperature conditions (T) using each of the sample and R410A;

(D-1): the lower limit of the combustion range measured in accordance with method A in High Pressure Gas Safety Act is at least 5 vol %; and (E-1): in a combustion test under conditions of 0.98 MPaG and 250° C. in equipment in accordance with method A for measurement of the combustion range in High Pressure Gas Safety Act, the pressure will not exceed 2.00 MPaG.

2. The working fluid according to claim 1, wherein the product of the relative coefficient of performance ($RCOP_{R410A}$) and the relative refrigerating capacity ($RQ_{R410A}$) is at least 0.900.

3. The working fluid according to claim 2, wherein the product of the relative coefficient of performance ($RCOP_{R410A}$) and the relative refrigerating capacity ($RQ_{R410A}$) is at least 0.950.

4. The working fluid according to claim 1, wherein the relative pressure ($RDP_{R410A}$) is at most 1.000.

5. The working fluid according to claim 1, wherein the working fluid has no combustion range.

6. A composition for a heat cycle system, the composition comprising the working fluid for heat cycle as defined in claim 1 and a refrigerant oil.

7. A heat cycle system, comprising the composition of claim 6.

8. The heat cycle system according to claim 7, wherein the heat cycle system is a refrigerating apparatus, an air-conditioning apparatus, a power generation system, a heat transport apparatus or a secondary cooling machine.

9. A working fluid for heat cycle, the working fluid being one of mixtures of:

1,1,2-trifluoroethylene (HFO-1123), 2,3,3,3-tetrafluoropropene (HFO-1234yf), and difluoromethane (HFC-32);

1,1,2-trifluoroethylene (HFO-1123), trans-1,3,3,3,-tetrafluoropropene (HFO-1234ze(E)), and difluoromethane (HFC-32);

cis-1,2-difluoroethylene (HFO-1132(Z)) and difluoromethane (HFC-32);

trans-1,2-difluoroethylene (HFO-1132(E)), 2,3,3,3-tetrafluoropropene (HFO-1234yf), and difluoromethane (HFC-32); or 1,1,2-trifluoroethylene (HFO-1123) and 2,3,3,3-tetrafluoropropene (HFO-1234yf), wherein the working fluid satisfies the following properties (A-1) to (E-1):

(A-1): the global warming potential (100 years) in Intergovernmental Panel on Climate Change (IPCC), Fourth assessment report, is at most 200;

(B-1): the product of the relative refrigerating capacity ($RQ_{R410A}$) calculated in accordance with the following formula (X) and the relative coefficient of performance ($RCOP_{R410A}$) calculated in accordance with the following formula (Y) is at least 0.820:

$$\text{Relative refrigerating capacity } (RQ_{R410A}) = \frac{\text{Refrigerating capacity of sample } (Q_{sample})}{\text{Refrigerating capacity of } R410A (Q_{R410A})} \quad (X)$$

$$\text{Relative performance of coefficient } (RCOP_{R410A}) = \frac{\text{Coefficient of performance of sample } (COP_{sample})}{\text{Coefficient of performance of } R410A (COP_{R410A})} \quad (Y)$$

wherein R410A is a mixture of difluoromethane and pentafluoroethane in a mass ratio of 1:1, and the sample is a working fluid to be subjected to relative evaluation; the refrigerating capacity of each of the sample and R410A is an output (kW) when a standard refrigerating cycle is operated under the following temperature conditions (T) using each of the sample and R410A; and the coefficient of performance of each of the sample and R410A is a value obtained by dividing the above output (kW) by the power consumption (kW) required for the above operation using each of the sample and R410A;

[Temperature conditions (T)]

the evaporation temperature is 0° C., provided that in the case of a non-azeotropic mixture, the evaporation temperature is the average temperature of the evaporation initiation temperature and the evaporation completion temperature, the condensing temperature is 40° C., provided that in the case of a non-azeotropic mixture, the condensing temperature is the average temperature of the condensation initiation temperature and the condensation completion temperature, the supercooling degree (SC) is 5° C., and the degree of superheat (SH) is 5° C.;

(C-1): the relative pressure ($RDP_{R410A}$) calculated in accordance with the following formula (Z) is at most 1.100:

$$\text{Relative pressure } (RDP_{R410A}) = \frac{\text{Compressor discharge gas pressure of sample } (DP_{sample})}{\text{Compressor discharge gas pressure of } R410A (DP_{R410A})} \quad (Z)$$

wherein R410A is a mixture of difluoromethane and pentafluoroethane in a mass ratio of 1:1, and the sample is a working fluid to be subjected to relative evaluation; the compressor discharge gas pressure of each of the sample and R410A is a compressor discharge gas pressure when a standard refrigerating cycle is operated under the above temperature conditions (T) using each of the sample and R410A;

(D-1): the lower limit of the combustion range measured in accordance with method A in High Pressure Gas Safety Act is at least 5 vol %; and (E-1): in a combustion test under conditions of 0.98 MPaG and 250° C. in equipment in accordance with method A for measurement of the combustion range in High Pressure Gas Safety Act, the pressure will not exceed 2.00 MPaG.

10. The working fluid according to claim 9, wherein the working fluid is one of mixtures of:

1,1,2-trifluoroethylene (HFO-1123), 2,3,3,3-tetrafluoropropene (HFO-1234yf), and difluoromethane (HFC-32);

1,1,2-trifluoroethylene (HFO-1123), trans-1,3,3,3,-tetrafluoropropene (HFO-1234ze(E)), and difluoromethane (HFC-32); or 1,1,2-trifluoroethylene (HFO-1123) and 2,3,3,3-tetrafluoropropene (HFO-1234yf).

* * * * *